Patented June 6, 1939

2,161,555

UNITED STATES PATENT OFFICE 2,161,555

METHOD OF PREPARING CELLULOSE FOR ESTERIFICATION

Loring W. Blanchard, Jr., Rochester, N. Y., assignor to Eastman Kodak Company, Rochester, N. Y., a corporation of New Jersey No Drawing. Application February 23, 1938,
Serial No. 192,063

5 Claims. (Cl. 260—229)

This invention relates to the making of cellulose propionate or butyrate and involves the inhibiting of the corrosive action of the pretreatment liquid by employing anhydrid therein in an amount slightly more than sufficient to combine with the water therein.

In the manufacture of cellulose acetate the cellulose may be sufficiently activated, without adversely affecting its physical properties, by soaking it in acetic acid in the absence of catalyst prior to its acetylation with the acetic anhydride.

In the manufacture of cellulose acetate propionate or cellulose acetate butyrate in which the content of propionyl or butyryl is not too high the cellulose may be presoaked with a bath predominantly consisting of acetic acid in the abdominantly consisting of acetic acid in the absence of catalyst which treatment satisfactorily activates the cellulose, prior to the esterification.

In the manufacture of cellulose propionate or cellulose butyrate or mixed esters containing a large proportion of propionyl or butyryl little or no acetic acid can be employed in practice in the presoaking or activating step due to the activity of the acetyl groups in the esterification. The removal of the acetic acid would render the process impractical and expensive. Thus it is necessary that little, if any, of the commonly preferred pretreating agents such as acetic acid and formic acid be present in the pretreatment or activation.

As chloracetyl groups do not combine with the cellulose in an esterification using an acid catalyst, chloracetic acid may be used in the prealyst soaking with propionic or butyric acid and impart a satisfactory degree of activation thereto, without interfering with the character of the ester obtained in the subsequent esterification. The mixture of chloracetic acid and fatty acid is very corrosive upon the equipment which is ordinarily employed in the commercial production of cellulose esters.

An object of my invention is to provide a method of pretreating cellulose in the making of high propionyl or high butyryl esters which will satisfactorily activate the cellulose for its esterification without corroding the vessels employed. Other objects of my invention will appear herein.

In the making of organic acid esters of cellulose, it is customary to first treat the cellulose to render it more easily susceptible to esterification. If it is immaterial whether or not an ester of lower viscosity results, the cellulose may be pretreated with a mixture of fatty acid and sulfuric acid prior to its esterification. If the viscosity of the ester is of some concern, the preliminary treatment is carried out omitting the sulfuric acid. In this case the cellulose must be swelled sufficiently or the subsequent esterification may be difficult. It is the pretreatment in the absence of catalyst with which my invention is concerned.

In making of cellulose propionate and cellulose butyrate, it is the more sluggish propionic and butyric anhydrides rather than acetic anhydride which are employed and consequently it is even more desirable that the cellulose be given a suitable preparation for esterification than where an acetyl cellulose is being prepared.

I have found that the cellulose is satisfactorily activated for esterification by propionic or butyric anhydride if it is treated with a mixture of either propionic or butyric acid or both and a substantial proportion of chloracetic acid. I have found that such a pretreatment may be carried out in the ordinary esterification equipment if sufficient anhydride such as propionic or butyric anhydride is present in the pretreatment liquid to combine with all of the water or moisture present in the liquid. It is preferred that the error, if any, be on the side of the anhydride so that slightly more than sufficient anhydride will be employed in practice. If desired the anhydride may be that of a substituted lower fatty acid such as chloracetic anhydride.

As an increase in the amount of anhydride in the pretreatment above that necessary to destroy the moisture present decreases the efficiency of the pretreatment it is preferred that the amount of anhydride be only slightly more than that necessary to combine with the water in the pretreatment liquid and in the cellulose. It is desirable that the chloracetic acid comprise at least 40% and preferably at least 60% or more of the pretreatment bath. Instead of mono-chloracetic acid, the di- or tri-chloracetic acid may be employed. As the chlor compounds are the most common they would ordinarily be used. Nevertheless other halogeno-acetic acids such as bromacetic or iodoacetic acid although more expensive could be employed with good effect.

The following examples illustrate my invention:

Example I 2.5 lbs. of cotton linters were placed in a mixture of 1.5 lbs. of butyric acid, 1.5 lbs. of butyric anhydride and 5 lbs. of chloracetic acid and the mass was maintained at a temperature of 110° C. for 4 hours. 8.5 lbs. of butyric anhydride were then added and the mass was cooled to 48° C. A solution of 36 cc. of sulfuric acid in 3.5 lbs. of butyric acid was added which induced esterification. The temperature was allowed to rise to 86° F. and held between 82° and 86° C. Five and one-half hours after the addition of the sulfuric acid solution, the reaction was finished.

The resulting ester was hydrolyzed by adding a mixture of 3 lbs. of water, 11 lbs. of acetic acid and 8 cc. of sulfuric acid to the complete reaction mass and maintaining at 100° F. for 120 hours. The ester, which was cellulose butyrate, was then precipitated from the mass by pouring into an aqueous precipitating bath, washed and dried.

*Example II*

30 lbs. of cotton linters were placed in a mixture of 18 lbs. of propionic acid, 18 lbs. of propionic anhydride and 60 lbs. of chloracetic acid and the mass was maintained at 110° F. for 4 hours. 82 lbs. of propionic anhydride was added and the mass was then cooled to 70° F. A mixture of 134 cc. of sulfuric acid and 32 lbs. of propionic acid was added. The temperature was allowed to rise to 108° F. and was maintained above 100° F. 2½ hours after the addition of the sulfuric acid, the batch was finished.

If hydrolysis is desired a mixture of 35 lbs. of water and 65 lbs. of acetic acid may be added and the mass may be kept at a hydrolyzing temperature such as about 100° F. until the desired amount of hydrolysis has occurred.

The ester, which is cellulose propionate, may be obtained by precipitation, washing and drying in the usual manner.

Other refined cellulose materials such as refined sulfite wood pulp may be employed as the starting material of my process. It is preferred that the cuprammonium viscosity of the starting material be not too low unless a low viscosity product is desired.

The esters prepared by my process are characterized by good resistance to moisture and solubility in a wide variety of solvents. Thus they lend themselves readily to the preparation of various commercial products such as sheeting, yarn and coating compositions.

If desired acetic anhydride may be employed to combine with the water in the pretreatment mass particularly if it is only necessary to use a small amount of acetic anhydride so that the proportion of acetyl in the pretreatment mixture is small. If a great proportion of acetyl is present in the pretreatment it will ordinarily result in a considerable proportion of acetyl in the product.

I claim:

1. In the preparation of cellulose esters in which the acyl content essentially consists of fatty acid groups of 3–4 carbon atoms, the pretreatment step which comprises treating cellulose with a catalyst-free pretreatment bath essentially consisting of fatty acid of 3–4 carbon atoms, a predominating proportion of chloracetic acid and sufficient, but not appreciably more than sufficient, anhydride of an organic acid of 2–4 carbon atoms to combine with all of the water present in the pretreatment mass.

2. In the preparation of cellulose esters in which the acyl content essentially consists of fatty acid groups of 3–4 carbon atoms, the pretreatment step which comprises treating cellulose with a catalyst-free pretreatment bath essentially consisting of fatty acid of 3–4 carbon atoms, a predominating proportion of chloracetic acid and sufficient, but not appreciably more than sufficient organic acid anhydride, corresponding to a fatty acid of 3–4 carbon atoms, to combine with all of the water present in the pretreatment mass.

3. In the preparation of cellulose esters in which the acyl content essentially consists of propionyl, the pretreatment step which comprises treating cellulose with a catalyst-free pretreatment bath essentially consisting of propionic acid, a predominating proportion of chloracetic acid and sufficient, but not appreciably more than sufficient, propionic anhydride, to combine with all of the water present in the pretreatment mass.

4. In the preparation of cellulose esters in which the acyl content essentially consists of butyryl, the pretreatment step which comprises treating cellulose with a catalyst-free pretreatment bath essentially consisting of butyric acid, a predominating proportion of chloracetic acid, and sufficient, but not appreciably more than sufficient, butyric anhydride to combine with all of the water present in the pretreatment mass.

5. In the preparation of cellulose esters in which the acyl content essentially consists of fatty acid groups of 3–4 carbon atoms, the pretreatment step which comprises treating cellulose with a catalyst-free pretreatment bath essentially consisting of fatty acid of 3–4 carbon atoms, a predominating proportion of chloracetic acid and sufficient, but not appreciably more than sufficient, chloracetic anhydride to combine with all of the water present in the pretreatment mass.

LORING W. BLANCHARD, Jr.